(12) United States Patent
Gordon

(10) Patent No.: US 7,832,146 B2
(45) Date of Patent: Nov. 16, 2010

(54) SELF WATERING PLANTER

(76) Inventor: Jeff Gordon, 24335 Melott Rd., Hillsboro, OR (US) 97123

( * ) Notice: Subject to any disclaimer, the term of this patent is extended or adjusted under 35 U.S.C. 154(b) by 341 days.

(21) Appl. No.: 12/134,470

(22) Filed: Jun. 6, 2008

(65) Prior Publication Data

US 2009/0300984 A1  Dec. 10, 2009

(51) Int. Cl.
*A01G 25/00* (2006.01)
(52) U.S. Cl. .......................................................... 47/79
(58) Field of Classification Search .............. 47/33, 47/65.5, 65.9, 79, 83; 405/36, 45; 220/23.89, 220/23.87, 23.86, 23.83
See application file for complete search history.

(56) References Cited

U.S. PATENT DOCUMENTS

| | | | | |
|---|---|---|---|---|
| 2,648,164 A | * | 8/1953 | Bruch ............................ 47/79 |
| 3,482,785 A | * | 12/1969 | Chapin et al. ............... 239/542 |
| 4,295,296 A | * | 10/1981 | Kinghorn ........................ 47/82 |
| 4,951,416 A | * | 8/1990 | Gutridge ..................... 47/62 R |
| 5,220,745 A | | 6/1993 | Elliott et al. |
| 5,373,662 A | * | 12/1994 | Wickstrom ..................... 47/82 |
| 7,219,468 B1 | | 5/2007 | Muxlow |
| 7,222,454 B1 | | 5/2007 | Chen |
| 2006/0156626 A1 | * | 7/2006 | Seaman ........................ 47/79 |

* cited by examiner

*Primary Examiner*—Michael R Mansen
*Assistant Examiner*—Monica Williams
(74) *Attorney, Agent, or Firm*—Bruce E Harang

(57) ABSTRACT

A self watering planter device and method of watering allowing water to be supplied by means of standard garden water hose and existing water faucet. A plurality of said self watering planters capable of being daisy-chained in a serial configuration to allow a single source of water from a standard water faucet and standard garden water hoses to provide irrigation water to all of said plurality of self watering planters.

12 Claims, 6 Drawing Sheets

SELF WATERING PLANTER

BACKGROUND OF THE INVENTION

1. Field of the Invention

The present invention relates generally to self watering devices and, more specifically, to a method and planter apparatus for housing and watering plants providing a container for housing house plants and providing irrigation to the plants housed therein as an integrated unit adaptable to connection to a standard garden water hose.

2. Description of the Related Art

Planter boxes require frequent watering, or else the flowers or other plants therein will quickly wither and die. This is true in moderate as well as hot climates, since such containers hold a relatively small volume of soil and are exposed on all sides, and therefore suffer rapid loss of moisture through evaporation. Moreover, planter boxes are frequently located under eaves, deck coverings, trees or other features that obstruct or limit their access to rain water.

The need for frequent and routine watering places a significant burden on the homeowner or gardener. The burden is especially difficult for persons who are subject to busy work schedules, as well as for the elderly and persons having limited mobility. Moreover, the situation can become acute if the person is absent for a significant period of time—when away on vacation, for example—unless the person can enlist the temporary services of a neighbor, friend or family member to tend to the watering.

These difficulties have, of course, been well known, and a number of solutions have been proposed over the years. While often effective in the sense of being able to achieve a degree of watering, none have represented an entirely satisfactory solution.

Certain of these prior devices have relied on electrically updated valves and controls. This approach has become increasingly common in recent years, however, it remains prohibitively expensive to provide a valve and electric controller for each planter box; moreover, to do so would require running not only a water line but also an electrical cord to each and every planter box. Certain electrically-operated systems have been developed that employ a central controller and valve assembly from which irrigation tubing is routed to individual destinations, however, this means that a multitude of tubes must be routed from their origin (typically, a garage or basement location) to the various plants Other automatic watering devices have been developed that do not rely on electrical power for their operation and are therefore free from some of the complications noted above. However, a satisfactory solution has remained elusive.

A few such non-electric devices have relied on structures or materials having physical characteristics that respond in some way to changes in moisture—for example, the swelling of a piece of wood—but as a group such mechanisms exhibit poor reliability and long-term durability. Others have been actuated by changes in height as the amount of water in the container increases/decrease, which offers the prospect of far more reliable operation, however, the mechanisms have generally been deficient for a number of reasons. For example, many of the gravity-operated mechanisms have been excessively complex and/or cumbersome, so that they are too bulky and too expensive to be used with individual planters or boxes, especially where a yard or deck contains a number of planters. The bulky, visually obtrusive appearance of many of these devices also renders them unsatisfactory from an aesthetic standpoint. Moreover, many of the mechanically operated devices are intended to operate in conjunction with an associated reservoir (e.g., a small water tank), which is only a partial solution, since the owner must replenish the reservoir itself on a periodic basis.

A few devices have been developed that take the more effective approach of controlling the flow of water through small-diameter tubing that can be connected to a tap or other pressure source and strung, unobtrusively along a deck railing or other support. However many of these devices require parts that must be machined, cast or molded with very close tolerances making such devices very expensive. Other devices require the use to soft flexible tubing folded to cut off the flow of water and allowed to straighten enough to allow the flow of water to the planter using some sort of spring mechanism. These types of devices, however, in that the need to flatten or flex the rubber tubing is somewhat difficult to achieve fine adjustments.

All of these devices whether electrical or mechanical require separate water lines to each planter and in many cases separate electrical and/or valves or valve controls for each planter also.

Accordingly, there exists a need for an apparatus that is both a planter that incorporates the irrigation functionality as an integral part of the planter and which can utilize a standard garden water hose to provide the water and timing apparatus. Further there exists a need for the ability to "daisy-chain" multiple planters together so that only one water line need be provided from a water source to irrigate all of the planters on a deck, a patio, a yard, or combinations thereof. Still further, there exists a need for such an integrated apparatus that is inexpensive to manufacture and that is durable and long-lasting in use.

SUMMARY OF THE INVENTION

The present invention is directed to providing a planter apparatus comprising both a plant container and a irrigation system as an integral unit that can be connected to a standard garden water hose to supply water and in which a plurality of such planter apparatus can be daisy-chained together to allow a single water source connection to irrigate all of the plurality of planter apparatus.

More particularly, the invention resides in a planter with an integral irrigation system that may be set on the ground or patio or deck surface, hung from a deck or other railing, or mounted on a vertical surface such as a wall or post, wherein said planter may be connected to a standard garden water hose for a water source.

One object of the present invention is providing a planter apparatus having an integral irrigation system connectable to an existing standard garden water hose without the need for special fittings or modifications of the planter apparatus to accept a water line or irrigation system therein.

Another object of the present invention is providing an optional hanger apparatus to allow the planter apparatus to easily be hung from a railing.

A further object of the present invention is providing an integral means of allowing attachment of the planter apparatus to a vertical surface such as a wall or post via common fasteners.

Yet another object of the present invention is providing a self watering planter for watering plants in said planter comprising: a planter box having a bottom, a front side, a backside, first and second ends, and having an open top, further having a pair of vertical mounting bores located in desired positions on said backside, said backside further comprising a mounting means for a irrigation tube and mounting means for a pair of rail mounting brackets; an irrigation tube comprising a tube having a plurality of bores to release water into said planter box, and having a first end having a female connector and a second end having a male connector for connection of standard garden water hose; a mounting plate for fixedly securing said irrigation tube and said pair of rail mounting brackets to said planter box; thereby providing a self water planter to which water may be supplied by a single water source by means of a standard garden water hose.

Still another object of the present invention is providing a plurality of self watering planters for watering plants in said plurality of self watering planters from a single water source by means of connecting said plurality of self watering planters to each other in a serial daisy-chain configuration, each of said plurality of self watering planters comprising: a planter box having a bottom, a front side, a backside, first and second ends, and having an open top, further having a pair of vertical mounting bores located in desired positions on said backside, said backside further comprising a mounting means for a irrigation tube and mounting means for a pair of rail mounting brackets; an irrigation tube comprising a tube having a plurality of bores to release water into said planter box, and having a first end having a female connector and a second end having a male connector for connection of standard garden water hose; a mounting plate for fixedly securing said irrigation tube and said pair of rail mounting brackets to said planter box; thereby providing a plurality of self water planters to which water may be supplied by a single water source by means of a standard garden water hose.

Yet still another object of the present invention is providing a method of watering plants contained in a plurality of self watering planters utilizing a single water source and common standard garden water hose to provide water to all of said self watering planters.

Beneficial effects of the present invention include the ability to use existing water faucets, and common garden hose to provide irrigation water to one or more of the claimed self watering planters as well as to allow for easy and economical connection of said one or more self watering planters to an existing lawn/garden watering system.

A complete understanding of the present invention may be obtained from the drawings and detailed description that follow.

DESCRIPTION OF THE PREFERRED EMBODIMENTS OF THE INVENTION

This invention was developed to provide an efficient and aesthetically pleasing method of irrigating a planter or plurality of planters requiring only a single common standard garden water hose to provide the water to all of the planters no matter the number. In addition, it was developed to allow for easy automatic planter irrigation on decks, patios, and landscaping using the available water facet and/or lawn watering system without the need for separate water and/or electrical lines to each planter.

Figure 1:
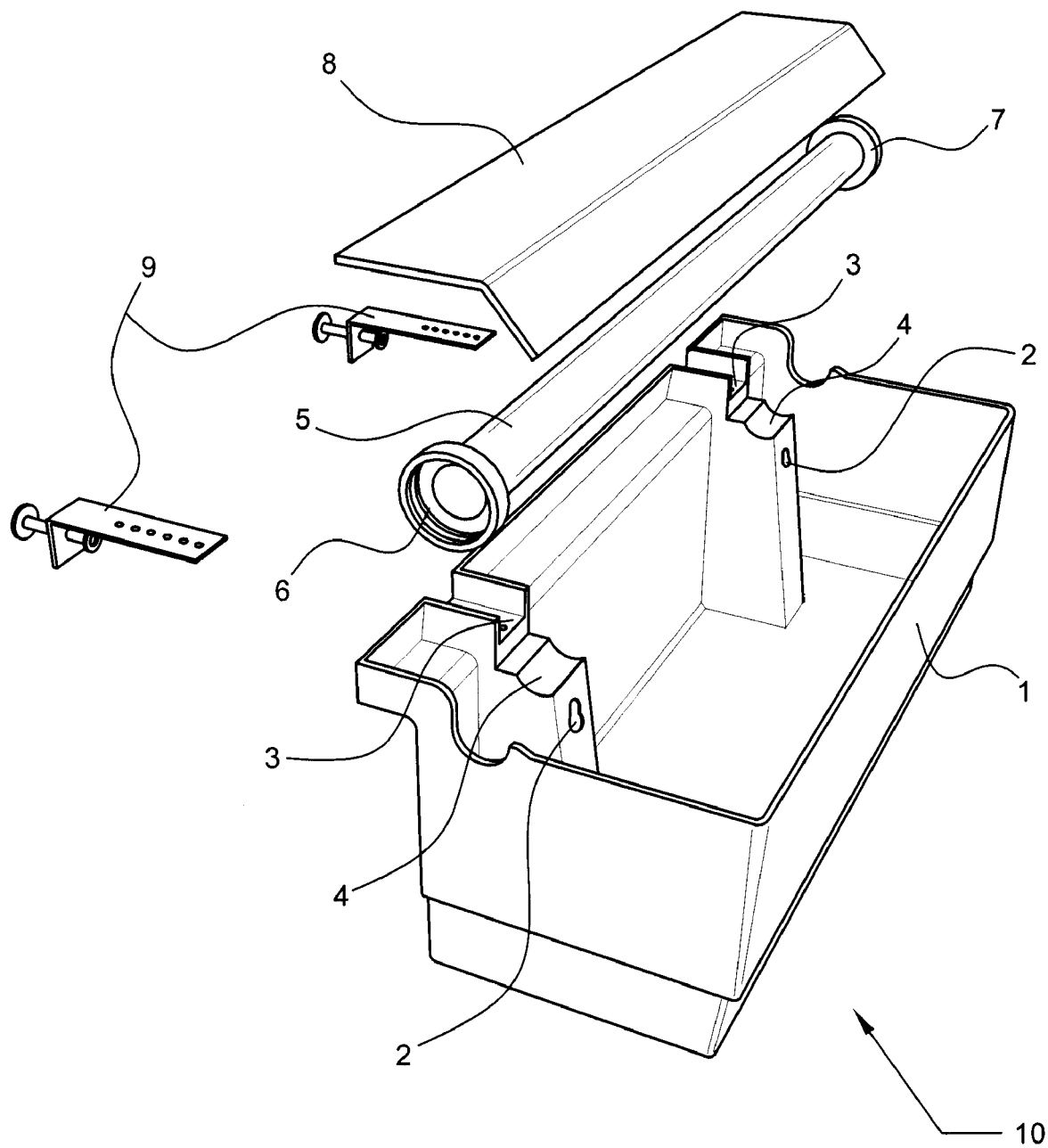
FIG. 1 shows a perspective exploded view of the present invention components including the optional hanger brackets prior to final assembly.

Turning to FIG. 1, shown therein is an illustrative perspective blow-up view of self watering self watering planter 10 of the present invention; comprising a planter box 1 having vertical surface mounting bores 2, bracket retaining means 3 for mounting optional rail mounting brackets 9, irrigation tube retaining means 4 for fixedly attaching irrigation tube 5 having a female connector 6 at a first end and a male connector 7 at a second end thereof, and a planter mounting plate 8 for securing the irrigation tube 5 fixedly to said planter box 1.

Figure 2:
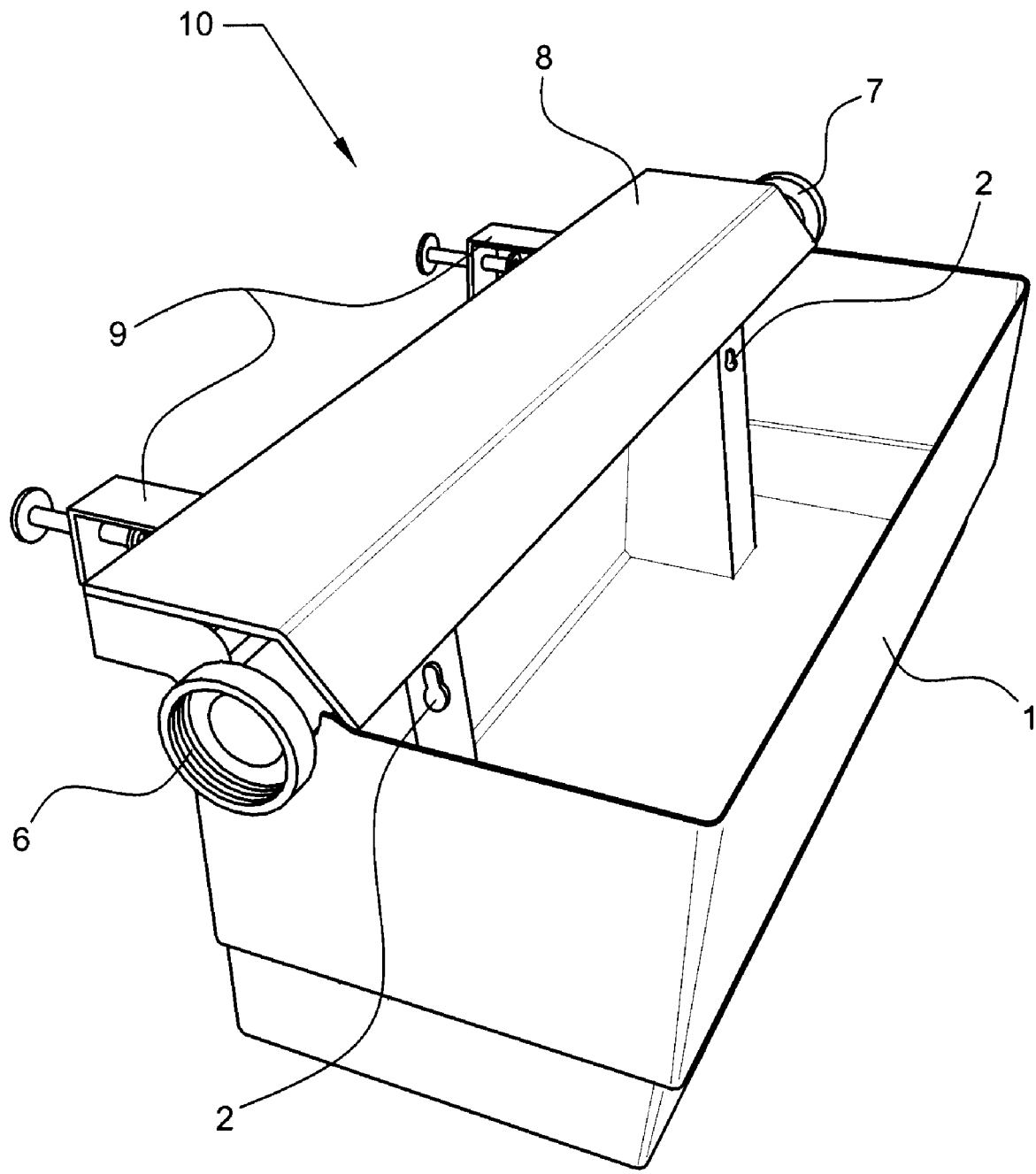
FIG. 2 shows a perspective view of the present invention assembled for use including the optional hanger brackets.

FIG. 2 shows a perspective view of the assembled self watering self watering planter 10 of the present invention illustrated in FIG. 1 including the planter box 1 having vertical surface mounting bores 2, planter mounting plate 8 fixedly securing the irrigation tube 5 (FIG. 1) having a female connector 6 and a male connector 7 attached at a first and a second end thereof respectively, and optional rail mounting brackets 9.

Figure 3:
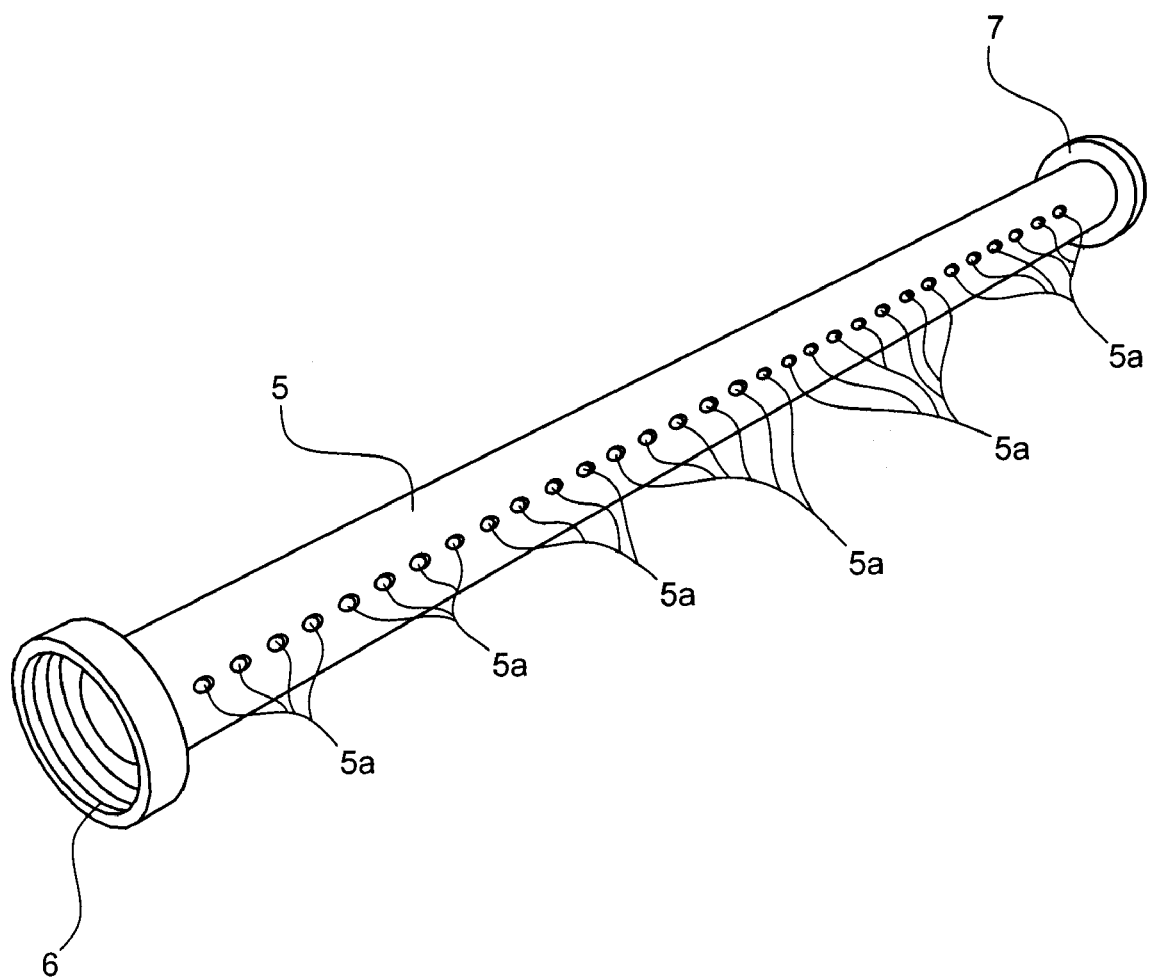
FIG. 3 show a perspective view of the irrigation tube showing the water outlet orifices.

FIG. 3 shows a perspective view of the irrigation tube 5 having a female connector 6 at a first end and a male connector 7 at a second end, and a plurality of irrigation water bores 5a located along the length of said irrigation tube.

Figure 4:
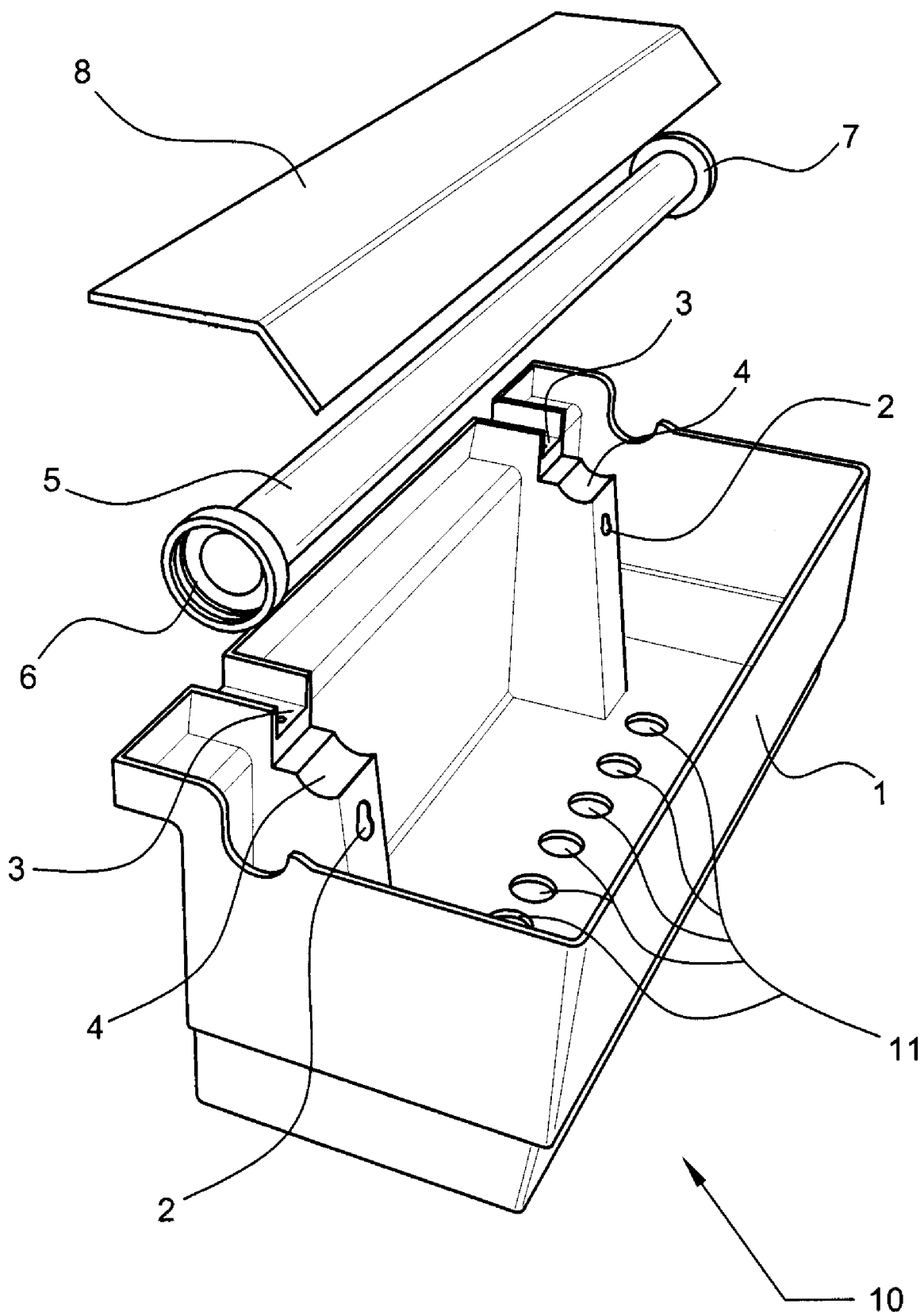
FIG. 4 shows a perspective exploded view of the present invention components including the optional drainage holes prior to final assembly

Turning now to FIG. 4, shown therein is an illustrative perspective blow-up view of self watering self watering planter 10 of the present invention; comprising a planter box 1 having vertical surface mounting bores 2, bracket retaining means 3 for mounting optional rail mounting brackets 9 (see FIGS. 1 & 2), an irrigation tube retaining means 4 for fixedly attaching irrigation tube 5 having a female connector 6 at a first end and a male connector 7 at a second end thereof, a planter mounting plate 8 for securing the irrigation tube 5 fixedly to said planter box 1, and optional drainage holes 11 in the bottom of planter box 1.

Figure 5:
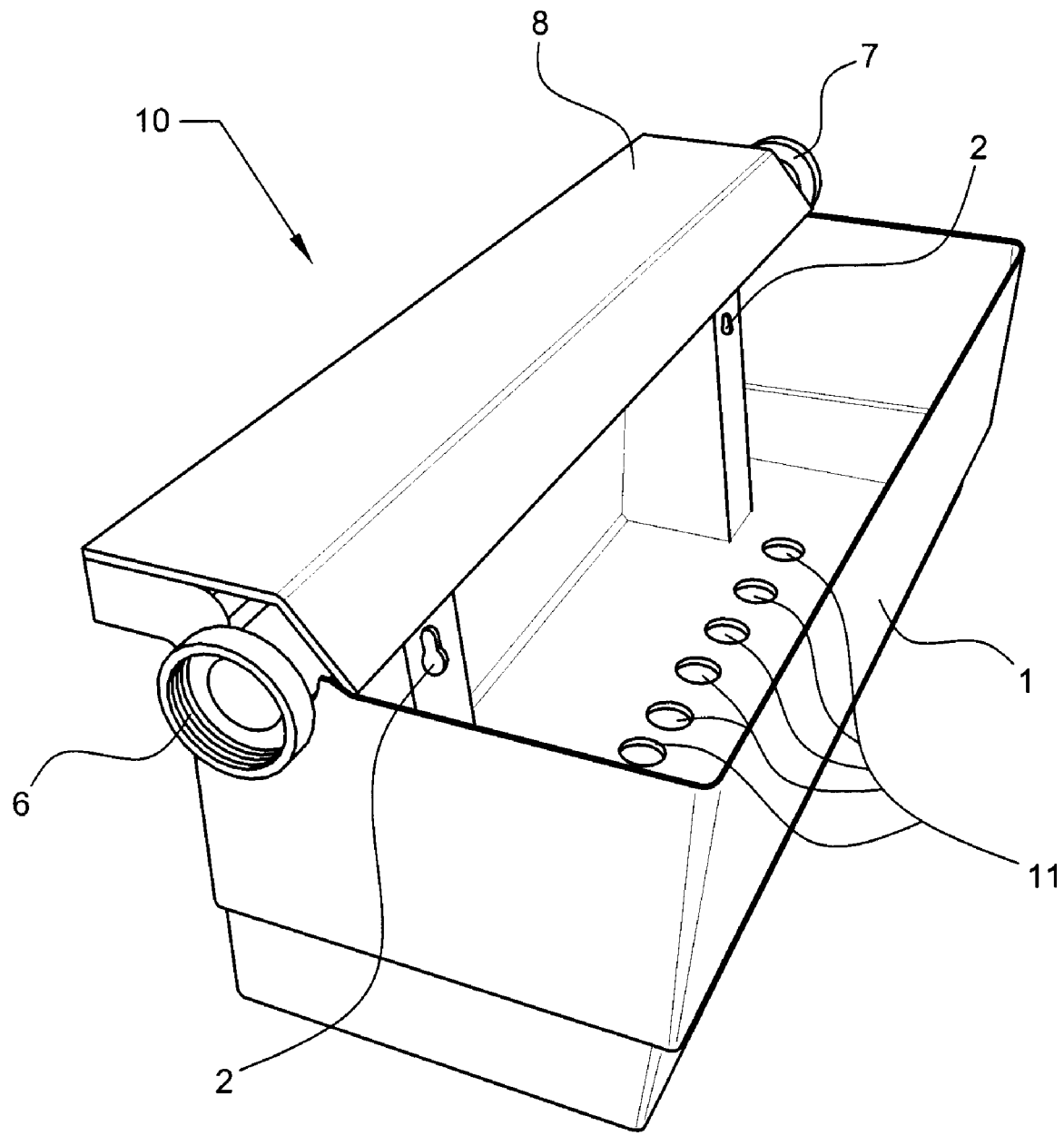
FIG. 5 shows a perspective view of the present invention assembled for use including the optional drainage holes.

Shown in FIG. 5 is a perspective view of the assembled self watering self watering planter 10 of the present invention illustrated in FIG. 4 including the planter box 1 having vertical surface mounting bores 2, planter mounting plate 8 fixedly securing the irrigation tube 5 (FIG. 4) having a female connector 6 and a male connector 7 attached at a first and a second end thereof respectively, and further optional drainage holes 11.

Figure 6:
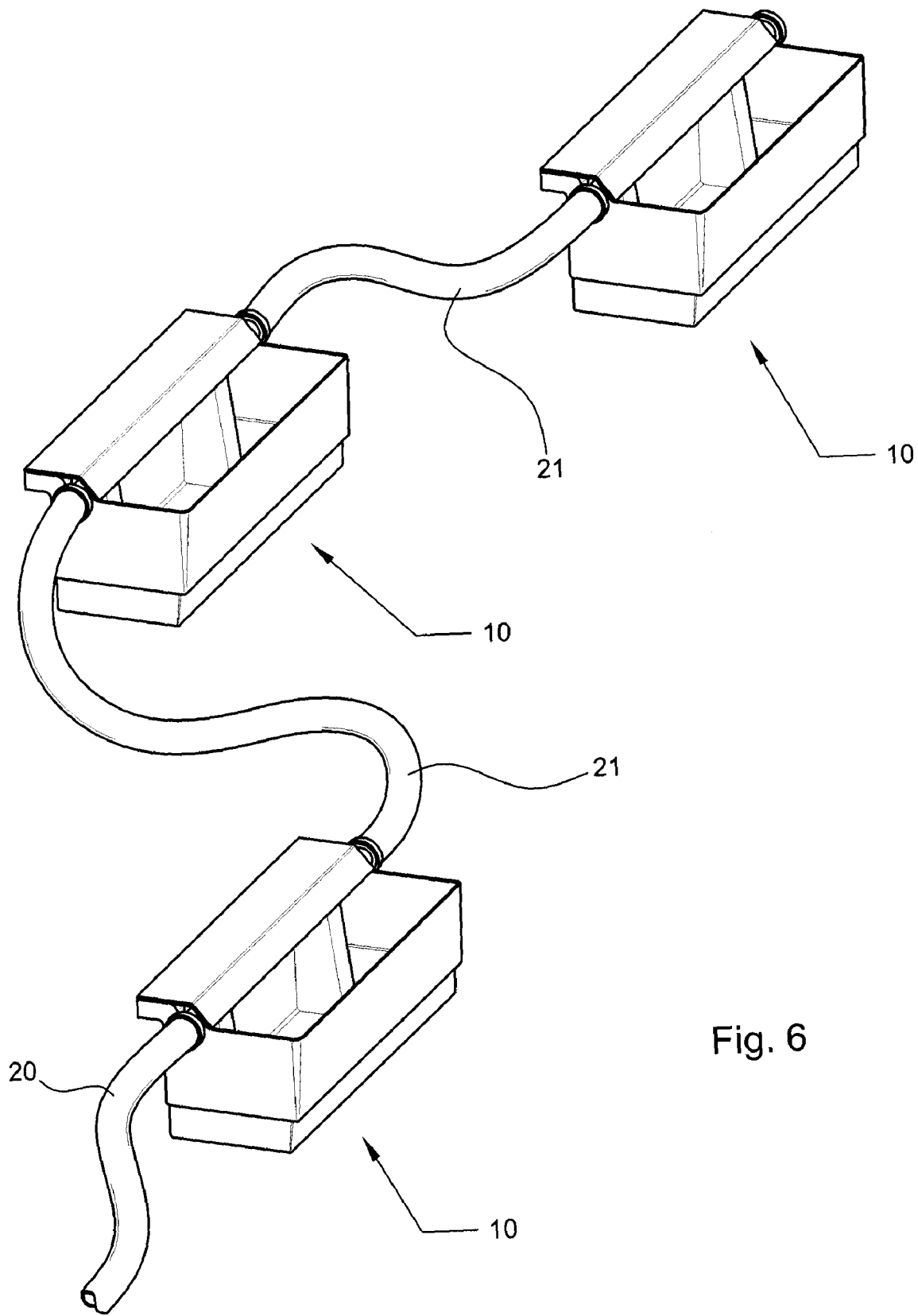
FIG. 6 shows a plurality of planters of the present invention connected in series to allow one water line to provide water to all of them.

Finally FIG. 6 shows a perspective view of a plurality of the self watering planters 10 of the present invention connected in series ("daisy-chained") together using connecting hoses 21 to allow a single water supply hose 20 to provide water to all of the plurality of said planters 10. It is to be appreciated that the self watering planters of the present invention may also be connected in parallel or in any combination of series and parallel using appropriate water line configurations as are well known in the art. It is to be appreciated that the second end of the last self watering planter of the present invention in the watering series may be left open to allow water to flow out or may be capped using a standard terminal end cap well known in the art to seal the watering system.

The use of the term "standard garden water hose" and the like includes garden water hose, and other lawn and garden irrigation piping and hose commonly sold for such uses and which is well known in the art such as, for example, standard PVC plumbing, standard ABS plumbing, low pressure poly rolled irrigation pipe, and combinations thereof. The means of connecting said well known water supply means also being well known in the art such as, for example, slip/glue fittings, threaded fittings, compression fittings and barbed plastic fittings.

Additionally, the self watering planters of the present invention can be used on the same water supply system as other devices such as sprinklers, soakers, and the like as are well known in the art.

In the presently preferred embodiment all of the parts of the present invention are formed by injection molding, however other methods for forming the various parts such as, for example, extrusion, and machining, are also contemplated. All of the various parts may be constructed of the same material or of various different materials within the knowledge of those skilled in art. The irrigation tube 5 may be formed as a single unitary unit or preferably the female end 6 can rotate independently of the irrigation tube 5 and male end 7. Suitable materials for forming the presently claimed invention are well known in the art and include, for example, acrylonitrile butadiene styrene (ABS), polypropylene (PP), high density polyethylene (HDPE), nylon, polycarbonate, styrene acrylonitrile (SAN), polystyrene, wood, and sheet metal. Presently preferred is acrylonitrile butadiene styrene (ABS).

The planter mounting plate may fixedly attach to the planter box by any well known fixing means including, for example, screws, locking tabs, bolt & nut, nylon wire ties, and clips. Presently preferred is the use of locking tabs.

Although the preferred embodiments of the present invention have been disclosed, various changes and modifications may be made without departing from the scope of the invention as set forth in the appended claims.

What is claimed is:

1. A self watering planter for watering plants in said planter comprising:
    a) a planter box having a bottom, a front side, a backside, first and second ends, and having an open top, further having a pair of vertical mounting bores located in desired positions on said backside, said backside further comprising a mounting means for a irrigation tube and mounting means for a pair of rail mounting brackets;
    b) an irrigation tube comprising a tube having a plurality of bores to release water into said planter box, and having a first end having a female connector and a second end having a male connector for connection of standard garden water hose;
    c) a mounting plate for fixedly securing said irrigation tube and said pair of rail mounting brackets to said planter box;
    thereby providing a self water planter to which water may be supplied by a single water source by means of a standard garden water hose.

2. The self watering planter as claimed in claim 1 wherein, said pair of rail mounting brackets is not installed.

3. The self watering planter as claimed in claim 1 wherein, said female end of said irrigation tube is fixedly attached to said irrigation tube.

4. The self watering planter as claimed in claim 1 wherein, said female end is rotatably attached to said irrigation tube.

5. The self watering planter as claimed in claim 1 wherein, said standard garden water hose is selected from the group comprising; flexible water hose, flexible lawn and garden irrigation pipe, substantially rigid lawn and garden irrigation pipe, and combinations thereof.

6. The self watering planter as claimed in claim 1 wherein, said planter box bottom has at least one drainage bore therethrough.

7. A plurality of self watering planters for watering plants in said plurality of self watering planters from a single water source by means of connecting said plurality of self watering planters to each other in a serial daisy-chain configuration, each of said plurality of self watering planters comprising:
    a) a planter box having a bottom, a front side, a backside, first and second ends, and having an open top, further having a pair of vertical mounting bores located in desired positions on said backside, said backside further comprising a mounting means for a irrigation tube and mounting means for a pair of rail mounting brackets;
    b) an irrigation tube comprising a tube having a plurality of bores to release water into said planter box, and having a first end having a female connector and a second end having a male connector for connection of standard garden water hose;
    c) a mounting plate for fixedly securing said irrigation tube and said pair of rail mounting brackets to said planter box;
    thereby providing a plurality of self water planters to which water may be supplied by a single water source by means of a standard garden water hose.

8. The plurality of self watering planter as claimed in claim 7 wherein, said pair of rail mounting brackets is not installed.

9. The plurality of self watering planter as claimed in claim 7 wherein, said female end of said irrigation tube is fixedly attached to said irrigation tube.

10. The plurality of self watering planter as claimed in claim 7 wherein, said female end is rotatably attached to said irrigation tube.

11. The self watering planter as claimed in claim 7 wherein, said standard garden water hose is selected from the group comprising; flexible water hose, flexible lawn and garden irrigation pipe, substantially rigid lawn and garden irrigation pipe, and combinations thereof.

12. The self watering planter as claimed in claim 7 wherein, said planter box bottom has at least one drainage bore therethrough.

* * * * *